United States Patent
Takezawa et al.

(10) Patent No.: US 8,344,645 B2
(45) Date of Patent: Jan. 1, 2013

(54) METHOD OF DRIVING DISCHARGE LAMP, DRIVING DEVICE, AND PROJECTOR

(75) Inventors: Takeshi Takezawa, Matsumoto (JP); Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/396,916

(22) Filed: Feb. 15, 2012

(65) Prior Publication Data

US 2012/0169247 A1 Jul. 5, 2012

Related U.S. Application Data

(63) Continuation of application No. 12/393,728, filed on Feb. 26, 2009, now Pat. No. 8,143,802.

(30) Foreign Application Priority Data

Feb. 29, 2008 (JP) ................................. 2008-049293

(51) Int. Cl.
*H05B 41/16* (2006.01)
*H05B 41/36* (2006.01)

(52) U.S. Cl. ...................................... 315/287; 315/291

(58) Field of Classification Search .................. 315/287, 315/291, 247, 311, 224, 225, 307, 308, 360, 315/85

See application file for complete search history.

(56) References Cited

U.S. PATENT DOCUMENTS

| | | | |
|---|---|---|---|
| 5,880,561 A | 3/1999 | Miyazaki et al. | |
| 6,646,392 B2 | 11/2003 | Slegers | |
| 6,713,972 B2 | 3/2004 | Nakagawa et al. | |
| 6,815,907 B2 | 11/2004 | Riederer | |
| 6,975,077 B2 | 12/2005 | Izumi et al. | |
| 7,052,141 B2 | 5/2006 | Akiyama | |
| 7,122,960 B2 * | 10/2006 | Tukamoto et al. | ............ 313/576 |
| 7,274,157 B2 | 9/2007 | Hirata et al. | |
| 7,377,670 B2 | 5/2008 | Takezawa | |
| 7,615,941 B2 | 11/2009 | Blumel | |
| 7,622,869 B2 | 11/2009 | Watanabe et al. | |
| 7,733,029 B2 | 6/2010 | Kikuchi | |
| 7,768,211 B2 | 8/2010 | Deppe et al. | |
| 7,786,682 B2 | 8/2010 | Ikeda et al. | |
| 7,855,512 B2 | 12/2010 | Ozasa et al. | |
| 7,909,473 B2 | 3/2011 | Deppe | |
| 7,923,940 B2 | 4/2011 | Okawa | |

(Continued)

FOREIGN PATENT DOCUMENTS

EP 1768468 A 3/2007

(Continued)

OTHER PUBLICATIONS

Non-Final Office Action received in U.S. Appl. No. 12/393,728; Sep. 20, 2011.

(Continued)

*Primary Examiner* — Daniel D Chang
(74) *Attorney, Agent, or Firm* — AdvantEdge Law Group, LLC

(57) ABSTRACT

In at least one embodiment of the disclosure, a method for driving a discharge lamp includes changing a duty ratio of an AC current to be supplied between a first electrode and a second electrode of the discharge lamp in accordance with a predetermined pattern, and setting a current value when the first electrode operates as an anode during one cycle so as to be smaller than a current value when the second electrode operates as an anode during one cycle.

14 Claims, 10 Drawing Sheets

U.S. PATENT DOCUMENTS

| | | |
|---|---|---|
| 8,044,602 B2 | 10/2011 | Yamauchi et al. |
| 2002/0011803 A1 | 1/2002 | Derra et al. |
| 2005/0082986 A1 | 4/2005 | Takezawa et al. |
| 2009/0153806 A1 | 6/2009 | Yamauchi et al. |

FOREIGN PATENT DOCUMENTS

| | | |
|---|---|---|
| JP | 59-012598 A | 1/1984 |
| JP | 3201981 B | 8/2001 |
| JP | 2005-019141 A | 1/2005 |
| JP | 2005-038815 A | 2/2005 |
| JP | 2006-032017 A | 2/2006 |
| JP | 3840054 B | 11/2006 |
| JP | 2007-115660 A | 5/2007 |
| WO | WO-2004-086453 A | 10/2004 |

OTHER PUBLICATIONS

Notice of Allowance and Notice of Allowability received in U.S. Appl. No. 12/393,728; Jan. 25, 2012.

Notice of Allowance and Notice of Allowability received in U.S. Appl. No. 12/372,370; Jul. 13, 2011.

\* cited by examiner

METHOD OF DRIVING DISCHARGE LAMP, DRIVING DEVICE, AND PROJECTOR

CROSS REFERENCE TO RELATED APPLICATIONS

The present application is a continuation of U.S. patent application Ser. No. 12/393,728 filed Feb. 26, 2009, which claims priority from Japanese Patent Application No. 2008-049293 filed Feb. 29, 2008, which is hereby incorporated by reference in its entirety.

BACKGROUND

1. Technical Field

The present invention relates to a method for driving a discharge lamp having a pair of electrodes, a driving device, and a projector including a light source incorporated with such a discharge lamp.

2. Related Art

Heretofore, a lighting method for a high-intensity discharge lamp using a single driving waveform is known. If lighting by a single driving waveform continues for a long time, the electrodes continuously have a predetermined temperature distribution for a long time, and as a result, asymmetry of the electrodes caused by a time-variant state change tends to increase as time passes. For this reason, a plurality of concavo-convexes are generated around the tip portions of the electrodes, and flicker occurs. In order to solve this problem, a lighting method for a high-intensity discharge lamp is known in which the absolute value of an AC lamp current to be supplied to the high-intensity discharge lamp is set constant, and the AC lamp current is pulse-width modulated (JP-T-2004-525496). Specifically, the ratio of a pulse width of a positive pulse and a pulse width of a negative pulse is pulse-width modulated with a frequency lower than the lighting frequency.

However, as described in JP-T-2004-525496, when the AC lamp current is pulse-width modulated, for example, if a light source is provided with an auxiliary mirror in order to efficiently converge light to be emitted forward, an electrode on the auxiliary mirror side may be excessively deteriorated, and a pair of electrodes may be deteriorated unevenly.

SUMMARY

An advantage of some aspects of the invention is that it provides a method for driving a discharge lamp, which is capable of preventing electrodes from wearing off unevenly, such a driving device, and a projector using the same.

According to an aspect of the invention, there is provided a method for driving a discharge lamp that supplies an AC current to a discharge lamp having a first electrode and a second electrode so as to produce discharge and to cause the discharge lamp to emit light. The method includes, in a situation where a tip portion of the first electrode becomes higher than a tip portion of the second electrode in temperature when power of the same amount is fed to the first and second electrodes during a steady operation in which the AC current is supplied to the first electrode and the second electrode, changing the duty ratio of the AC current to be supplied between the first electrode and the second electrode in accordance with a predetermined pattern, and setting a current value when the first electrode operates as an anode during one cycle so as to be smaller than a current value when the second electrode operates as an anode during one cycle.

With this driving method, during the steady operation, the duty ratio of the AC current to be supplied between the first electrode and the second electrode is changed in accordance with the predetermined pattern, and the current value when the first electrode operates as an anode during one cycle is set so as to be smaller than the current value when the second electrode operates as an anode during one cycle. Therefore, the first electrode can be prevented from being liable to be higher than the second electrode in temperature when power of the same amount is fed, and as a result, the first electrode can be prevented from being deteriorated earlier than the second electrode.

According to a specific example or respect of the invention, in the above-described driving method, a primary reflecting mirror may be disposed on the second electrode side to reflect a light beam generated by discharge between the first electrode and the second electrode so as to be emitted toward a region to be illuminated, and an auxiliary reflecting mirror may be disposed on the first electrode side so as to be opposite the primary reflecting mirror to reflect a light beam from an inter-electrode space between the first electrode and the second electrode toward the inter-electrode space. In this case, the first electrode on the auxiliary reflecting mirror side can be prevented from becoming higher than the second electrode on the primary reflecting mirror in temperature. The reason why the first electrode on the auxiliary reflecting mirror side has a comparatively high temperature is considered that the first electrode is located closer to the auxiliary reflecting mirror and is likely to be more exposed to radiation heat from the auxiliary reflecting mirror, or that cooling wind flowing around the light-emitting tube is blocked by the auxiliary reflecting mirror, and cooling efficiency is lowered on a side of the first electrode covered with the auxiliary reflecting mirror, that is, in a hemisphere in which the first electrode is accommodated.

According to another example of the invention, the AC current may constantly provide a difference of a predetermined current value between the absolute value of the current value when the first electrode operates as an anode during one cycle and the absolute value of the current value when the second electrode operates as an anode during one cycle. In this case, the first electrode and the second electrode are maintained at the same temperature, and in terms of thermoelectronic emission, the balance of both electrodes is maintained, thereby maintaining stable arc discharge. In addition, the driving waveform can be simply formed by superimposing a DC current on a square wave.

According to yet another example of the invention, the AC current may constantly provide a difference of a predetermined ratio between the absolute value of the current value when the first electrode operates as an anode during one cycle and the absolute value of the current value when the second electrode operates as an anode during one cycle. In this case, the first electrode and the second electrode are maintained at the same temperature, and in terms of thermoelectronic emission, the balance of both electrodes is maintained, thereby maintaining stable arc discharge.

According to yet another example of the invention, the current value may be controlled such that the average power value during one cycle of the AC current substantially becomes identical to the average power value during one cycle of the predetermined pattern. In this case, power during emission is maintained constant, and thus a change in luminance corresponding to the cycle of the predetermined pattern is difficult to be generated.

According to yet another example of the invention, the current value may be controlled only at a polarity having a larger duty ratio during one cycle of the AC current. In this case, the current value at a polarity having a smaller duty ratio is maintained constant, and the emission state of the discharge lamp is stably maintained.

According to an aspect of the invention, there is provided a driving device that supplies an AC current to a discharge lamp having a first electrode and a second electrode so as to produce discharge and to cause the discharge lamp to emit light. The driving device includes a current driving circuit that, in a situation where a tip portion of the first electrode becomes higher than a tip portion of the second electrode in temperature when power of the same amount is fed to the first and second electrodes during a steady operation in which the AC current is supplied to the first electrode and the second electrode, changes the duty ratio of the AC current to be supplied between the first electrode and the second electrode in accordance with a predetermined pattern, and sets the absolute value of a current value when the first electrode operates as an anode during one cycle so as to be smaller than the absolute value of a current value when the second electrode operates as an anode during one cycle.

With this driving device, during the steady operation, the driving circuit changes the duty ratio of the AC current to be supplied between the first electrode and the second electrode in accordance with the predetermined pattern, and sets the current value when the first electrode operates as an anode during one cycle so as to be smaller than the current value when the second electrode operates as an anode during one cycle. Therefore, the first electrode can be prevented from being liable to be higher than the second electrode in temperature when power of the same amount is fed, and as a result, the first electrode can be prevented from being deteriorated earlier than the second electrode.

According to an aspect of the invention, a projector includes a light source device that is driven by the above-described driving method and emits light, a light modulation device that receives a light beam from the light source device, and a projection optical system that projects an image formed by the light modulation device.

With this projector, the above-described light source device is used. Therefore, both electrodes of the light source device can be prevented from being deteriorated, or the electrodes can be prevented from being deteriorated unevenly. As a result, the projection luminance of the projector can be maintained over a long period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a light source device incorporated with a driving device for a discharge lamp according to an embodiment of the invention will be described with reference to the drawings.

Figure 1:
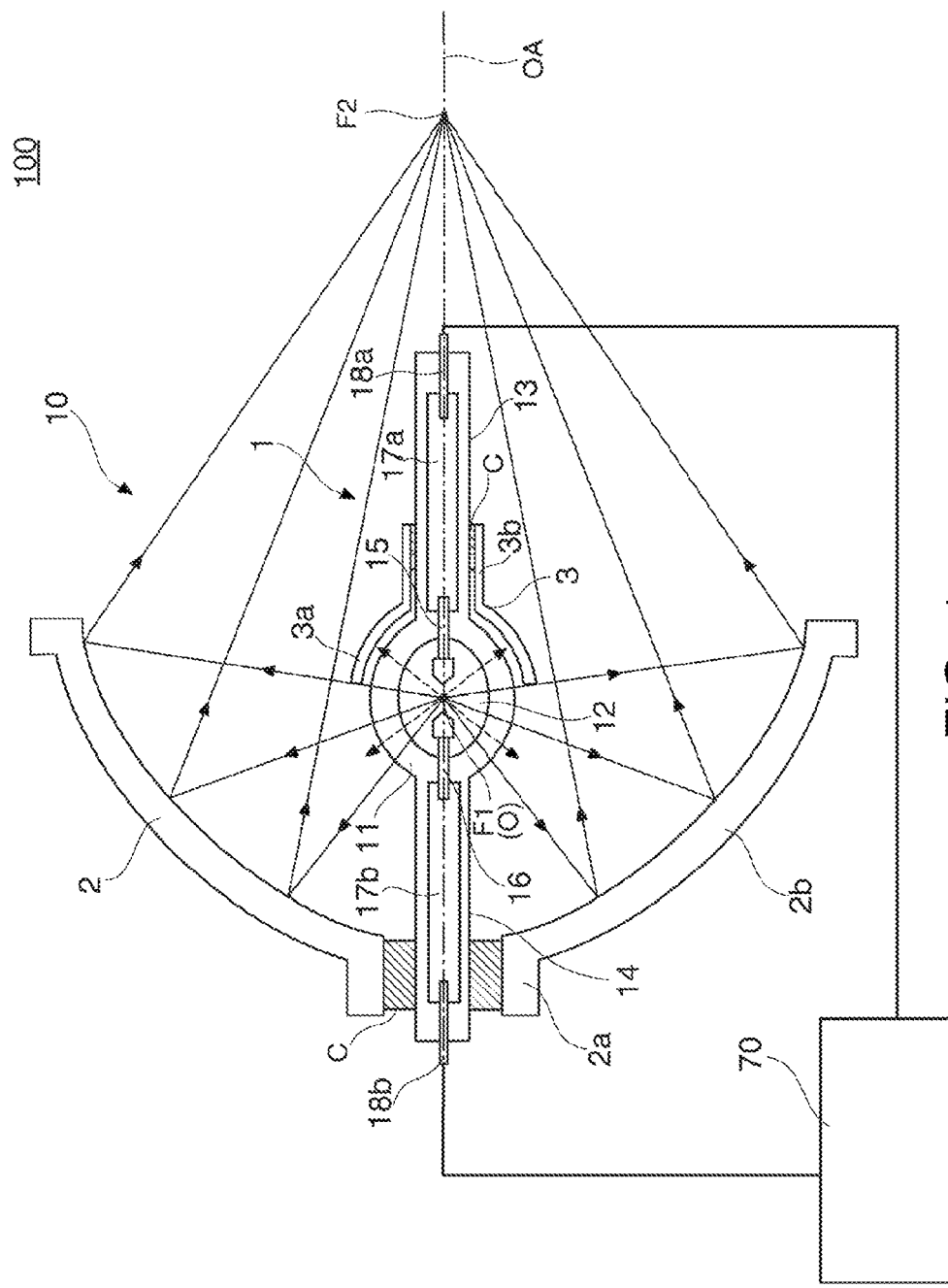
FIG. 1 is a sectional view illustrating alight source device according to an embodiment of the invention.

FIG. 1 is a sectional view conceptually illustrating the structure of a light source device 100. In the light source device 100, a light source unit 10 includes a discharge emission-type light-emitting tube 1 serving as a discharge lamp, an elliptical reflector 2 serving as a primary reflecting mirror, and a spherical auxiliary mirror 3 serving as an auxiliary reflecting mirror. A light source driving device 70 includes, an electrical circuit, serving as a driving device for a discharge lamp, which supplies an AC current to the light source unit 10 so as to cause the light source unit 10 to emit light in a desired state.

In the light source unit 10, the light-emitting tube 1 is formed of a transmissive silica glass tube having a central portion thereof swollen spherically. The light-emitting tube 1 includes a body portion 11 that is a sealed body configured to emit light for illumination, and first and second seal portions 13 and 14 that extend along an axis passing through both ends of the body portion 11.

In a discharge space 12 formed in the body portion 11, a tip portion of a first electrode 15 made of tungsten and a tip portion of a second electrode 16 made of tungsten are disposed so as to be spaced at a predetermined distance from each other, and a compound containing rare gas and halogen and mercury are filled. In respective seal portions 13 and 14 extending from both ends of the body portion 11, metal foils 17a and 17b made of molybdenum are filled, respectively. The metal foils 17a and 17b are electrically connected to base portions of the first and second electrodes 15 and 16 provided in the body portion 11, respectively. The seal portions 13 and 14 are sealed airtight from the outside by a glass material. If power is supplied to the light-emitting tube 1 through lead wires 18a and 18b connected to the metal foils 17a and 17b by the light source driving device 70 in the form of AC pulses, arc discharge is generated between a pair of electrodes 15 and 16, and the body portion 11 emits light with high-intensity.

The auxiliary mirror 3 is located close to the body portion 11 of the light-emitting tube 1 and covers a substantially half of the body portion 11 on a front side in a beam emission direction on which the first electrode 15 is present. The auxiliary mirror 3 is a mold product made of silica glass as a single body. The auxiliary mirror 3 includes an auxiliary reflecting portion 3a that gets the light beam emitted from the body portion 11 of the light-emitting tube 1 toward the front back to the body portion 11, and a support portion 3b that is fixed to the periphery of the first seal portion 13 in a state of supporting a base portion of the auxiliary reflecting portion 3a. The support portion 3b has the first seal portion 13 inserted therein and holds the auxiliary reflecting portion 3a in a state of being aligned with the body portion 11.

The reflector 2 is disposed so as to be opposite a substantially half of the body portion 11 of the light-emitting tube 1 on a rear side in the beam emission direction on which the second electrode 16 is present. The reflector 2 is a mold product made of crystallized glass or silica glass as a single body. The reflector 2 includes a neck portion 2a through which the second seal portion 14 of the light-emitting tube 1 is inserted, and a primary reflecting portion 2b that has an elliptically curved surface expanding from the neck portion 2a. The neck portion 2a has the second seal portion 14 inserted therein and holds the primary reflecting portion 2b in a state of being aligned with the body portion 11.

The light-emitting tube 1 is disposed along a system optical axis OA corresponding to an axis of rotational symmetry or an optical axis of the primary reflecting portion 2b such that an emission center O between the first and second electrodes 15 and 16 inside the body portion 11 becomes substantially identical to the position of a first focus F1 of the elliptically curved surface of the primary reflecting portion 2b. When the light-emitting tube 1 is lighted, light beams emitted from the arc around the emission center O of the body portion 11 are reflected by the primary reflecting portion 2b or reflected by the auxiliary reflecting portion 3a and then further reflected by the primary reflecting portion 2b, and are formed as light beams converged at the position of a second focus F2 of the elliptically curved surface. That is, the reflector 2 and the auxiliary mirror 3 have reflecting curved surfaces substantially axisymmetric with respect to the system optical axis OA, and the pair of electrodes 15 and 16 are disposed such that the electrode axis becomes substantially identical to the system optical axis OA, which is the center of the axis thereof.

The light-emitting tube 1 is manufactured by a shrink seal which supports the first and second electrodes 15 and 16 individually fixed to the tips of the metal foils 17a and 17b inside a silica glass tube, and in which the silica glass tube is heated from the periphery thereof by a burner at portions corresponding to both seal portions 13 and 14, softened, and contracted. The auxiliary mirror 3 is fixed to the light-emitting tube 1 by injecting, filling, and solidifying an inorganic adhesive C in a state where the support portion 3b is inserted through the first seal portion 13 of the light-emitting tube 1. The light-emitting tube 1 is fixed to the reflector 2 by injecting, filling, and solidifying an inorganic adhesive C in a state where the second seal portion 14 is inserted into the neck portion 2a of the reflector 2.

Figure 2:
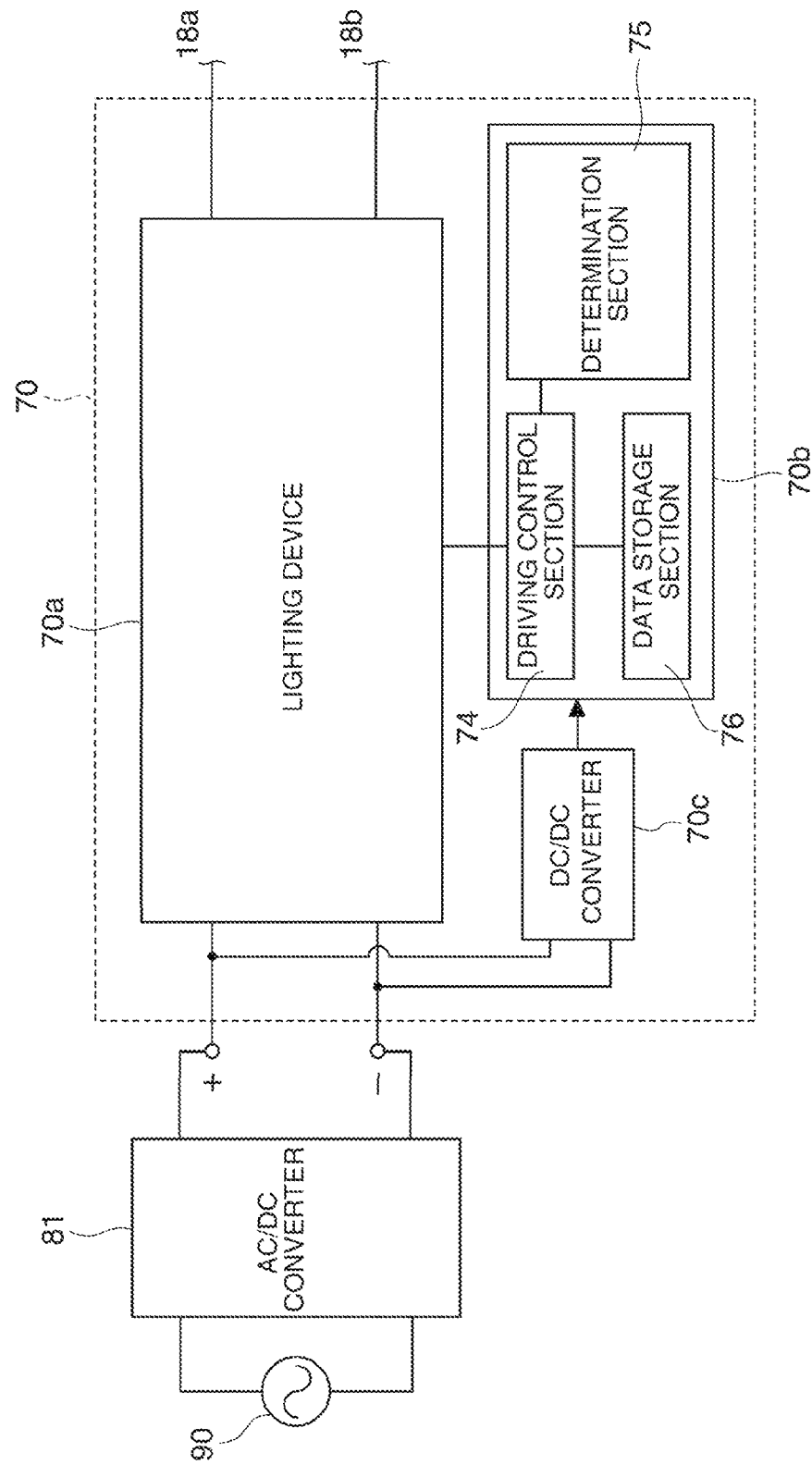
FIG. 2 is a block diagram showing the configuration of a current driving device incorporated into a light source device.

FIG. 2 is a block diagram schematically showing the configuration of the light source driving device 70 for turning on the light source unit 10 shown in FIG. 1 in a desired state.

The light source driving device 70 generates an AC current for producing discharge between a pair of electrodes 15 and 16 shown in FIG. 1, and controls the supply state of the AC current to both electrodes 15 and 16. The light source driving device 70 includes a lighting device 70a, a control device 70b, and a DC/DC converter 70c. Here, an example where the light source driving device 70 uses an external power supply will be described. That is, the light source driving device 70 is connected to an AC/DC converter 81, and the AC/DC converter 81 is connected to a commercial power supply 90. The AC/DC converter 81 converts an AC current, which is supplied from the commercial power supply 90, into a DC current.

The lighting device 70a is a circuit that is driven to turn on the light source unit 10 shown in FIG. 1. The lighting device 70a adjusts a driving waveform output from the light source driving device 70. Here, the driving waveform has factors, such as frequency of output current or voltage, amplitude, duty ratio, ratio of positive and negative amplitudes, waveform characteristics, and the like. A driving current having an arbitrary waveform characteristic, such as a square wave, a superimposed wave obtained by superimposing a triangular wave on such a square wave, or the like is output from the lighting device 70a to the light source unit 10.

The control device 70b is a circuit unit that includes a microcomputer, a memory, a sensor, an interface, and the like, and is driven by an appropriate driving voltage generated by the DC/DC converter 70c serving as a power supply. The control device 70b includes a driving control section 74 that controls the operation state of the lighting device 70a, a determination section 75 that determines the state of the light-emitting tube 1, and a data storage section 76 that stores various kinds of information regarding the operation mode of the lighting device 70a, that is, power feed conditions and the like.

The driving control section 74 operates in accordance with a program stored in the data storage section 76 or the like. The driving control section 74 selects one of a power feed condition for an initial operation and a power feed condition for a steady operation stored in the data storage section 76 in accordance with the current state of the light-emitting tube 1, and causes the lighting device 70a to execute the initial operation or the steady operation in accordance with the selected power feed condition. The driving control section 74 functions as a current driving circuit that feeds power to the light-emitting tube 1 to execute a necessary lighting operation, together with the lighting device 70a. In this embodiment, an operation to supply normal energy to the second electrode 16 and the first electrode 15 is called the steady operation, and an operation, different from the steady operation when lighting starts before the steady operation is executed, to supply energy to the second electrode 16 and the first electrode 15 is called the initial operation.

The determination section 75 determines the operation condition of the light-emitting tube 1, such as a deterioration level, on the basis of the state of the light-emitting tube 1, that is, a cumulative lighting time of the light-emitting tube 1, an inter-electrode voltage to the light-emitting tube 1, and the like.

The data storage section 76 stores a plurality of power feed conditions for the initial operation as the initial operation modes of the light-emitting tube 1 and a plurality of power feed conditions for the steady operation as the steady operation modes of the light-emitting tube 1, in addition to the program for the operation of the driving control section 74. Specifically, the data storage section 76 stores various parameters, such as set values of a current value, a frequency, and the like during the initial operation, for example, when initiation or during a rising time period. The data storage section 76 also stores various parameters regarding a current value, a lighting frequency, a duty ratio, modulation contents of the duty ratio, a ratio of positive and negative amplitudes, a triangular wave jump rate, and the like during the steady operation. The modulation contents of the duty ratio include a variable range of the duty ratio, a division period, a modulation frequency, a correction amount, and the like as parameters.

Figure 3:
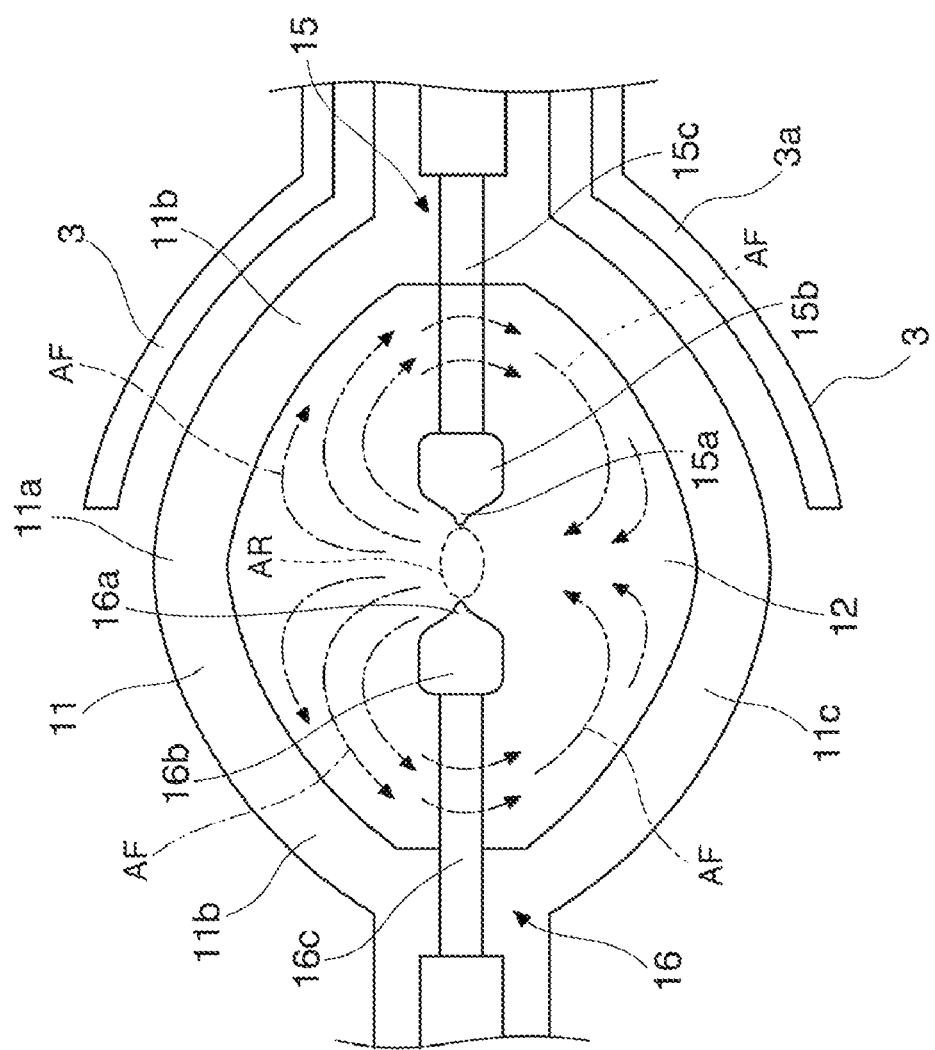
FIG. 3 is an enlarged sectional view illustrating a body portion of a light-emitting tube.
Figure 4A:
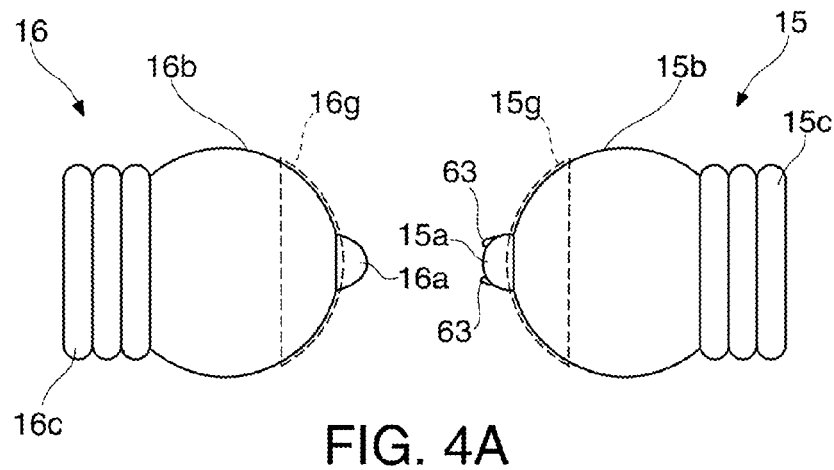
FIGS. 4A to 4C are enlarged views illustrating a repair process of electrodes by a light source driving device.
Figure 4B:
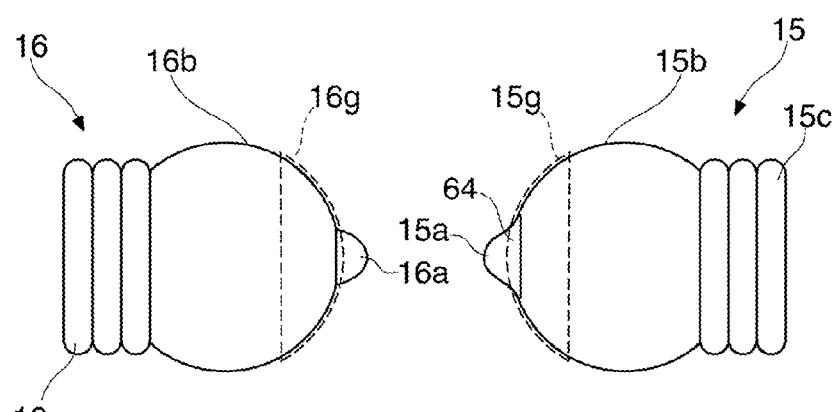
Figure 4C:
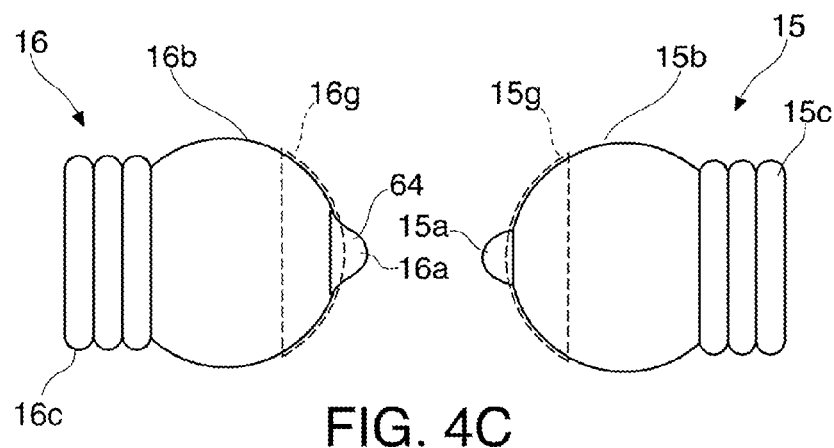

FIG. 3 is an enlarged sectional view illustrating the inside of the body portion 11 of the light-emitting tube 1 shown in FIG. 1. FIGS. 4A to 4C are conceptual views illustrating a repair process of both electrodes 15 and 16. As shown in the drawings, the first and second electrodes 15 and 16 in the body portion 11 individually includes tip portions 15a and 16a, large diameter portions 15b and 16b, and shaft portions 15c and 16.

In the case of the first electrode 15 shown in FIG. 4A, a plurality of minute concavo-convexes 63 are formed in a surface on a tip side of the tip portion 15a. In this case, a phenomenon that a discharge start point is moved between the tip portion 15a and the concavo-convexes 63, that is, flicker or arc jump occurs. Here, flicker means a phenomenon that the discharge start point is continuously moved, and arc jump means a phenomenon that the discharge start point is completely moved from an original discharge start point. Flicker or arc jump causes display flicker or deterioration of illuminance.

It is assumed that in order to prevent flicker or arc jump after or before the fact, during the steady operation of the light-emitting tube 1, as described below in detail, the first and second electrodes 15 and 16 are alternately subject to a cyclic repair process.

In an example shown in FIG. 4B, for example, the duty ratio of the AC current indicating the ratio of an operation time of the first electrode 15 as an anode is set so as to be appropriately larger than 50% during one cycle. When this happens, the temperature of the tip of the first electrode 15 rises, and the concavo-convexes 63 of FIG. 4A are melted, thereby forming a molten portion 64. Specifically, if the duty ratio (hereinafter, also referred to as an AC current duty ratio) indicating the ratio of an operation time as an anode during one cycle of the AC current included in the current waveform to be supplied to a pair of electrodes 15 and 16 is maintained so as to be larger than 50% for a predetermined time, the rise in temperature of the tip of an electrode (in FIG. 4B, the first electrode 15) serving as an anode when the anode duty ratio is larger than 50% can be appropriately controlled. The adjustment of the amount of rise in temperature of the tip of the first electrode 15 ensures that the molten portion 64 can be formed in the surface of the tip portion 15a while the tip portion 15a substantially slightly remains, and the concavo-convexes 63 can become flat. After the tip of the first electrode 15 is sufficiently heated, as shown in FIG. 4C, if the AC current duty ratio indicating the ratio of the operation time of the first electrode 15 as an anode during one cycle is maintained so as to be smaller than 50% for a predetermined time, the fall in temperature of the tip of the first electrode 15 can be appropriately controlled. As a result, the molten portion 64 of FIG. 4B is gradually cooled. The cooled molten portion 64 is solidified, and as shown in FIG. 4C, the tip portion 15a is maintained in a taper shape having an adequately large size.

In the foregoing description, repair driving has been described focusing on the first electrode 15, but for the second electrode 16, the same repair driving may be performed simultaneously. That is, in the state shown in FIG. 4C, the temperature of the tip of the second electrode 16 rises, and the molten portion 64 is formed. Next, if the state of FIG. 4C returns to the state of FIG. 4B, the temperature of the tip of the second electrode 16 falls, the cooled molten portion 64 is solidified. Thus, the shape of the tip portion 16a is maintained in a taper shape.

That is, by alternately repeating the state of FIG. 4B where the first electrode 15 serving as an anode is heated and the second electrode 16 is cooled, and the state of FIG. 4C where the second electrode 16 serving as an anode is heated and the first electrode 15 is cooled, the first and second electrodes 15 and 16 are alternately repaired. Therefore, both electrodes 15 and 16 can be prevented from being deteriorated, and the lifespan of the light-emitting tube 1 can be extended.

Returning to FIG. 3, during the steady operation in which the light-emitting tube 1 operates in a substantially stable state, an arc AR is formed in an inter-electrode space between the tip portions 15a and 16a of a pair of electrodes 15 and 16 by arc discharge. The arc AR and the periphery thereof become high in temperature. For this reason, convection AF flowing from the arc AR upward is formed in the discharge space 12. The convection AF hits a top portion 11a of the body portion 11, is moved along an upper half portion 11b thereof, passes through the shaft portions 15c and 16c of both electrodes 15 and 16, and is settled while being cooled. The settled convection AF is further settled along a lower half portion 11c of the body portion 11, collides against each other below the arc AR, and rises so as to return to the arc AR upward. That is, the convection AF is formed and circulated around both electrodes 15 and 16, but the convection AF may include an electrode material melted and evaporated by the arc AR. The electrode material may be topically accumulated or segregated in the shaft portions 15c and 16c by normal convection and may be grown in the form of needle, and unintended discharge may be produced toward the upper half portion 11b. Unintended discharge causes deterioration of an inner wall of the body portion 11 and shortening of the lifespan of the light-emitting tube 1. In addition, when lighting by a single driving waveform continues for a long time, the electrodes continuously have a predetermined temperature distribution for a long time, and as a result, asymmetry of the electrodes caused by a time-variant state change tends to increase as time passes. For this reason, the duty ratio of the AC current to be supplied between the first and second electrodes 15 and 16 is slowly changed so as to be waved, and the temperature distribution of the electrodes is cyclically changed. Then, the electrodes are prevented from being deteriorated unevenly, and normal convection AF is prevented from being formed in the discharge space 12 due to a difference in temperature, several hundred K, between the left and right electrodes. Specifically, the duty ratio of the current waveform is cyclically changed in a cycle sufficiently larger than the cycle of the AC current included in the current waveform to be supplied to a pair of electrodes 15 and 16. In this case, in order to increase the change of the convection AF, a pattern for changing the duty ratio of the AC current to be supplied to the electrodes 15 and 16 is maintained at a plurality of different values for a predetermined period of time or more in a plurality of division periods constituting a cyclic period (that is, modulation cycle) regarding the change of the duty ratio. That is, the duty ratio of the AC current in the current waveform to be supplied to the electrodes 15 and 16 is changed in a stepwise manner by a discrete value, and is cyclically increased or decreased over a sufficiently long period of time. By adjusting the variable range of the AC current duty ratio and the displacement cycle, the first and second electrodes 15 and 16 shown in FIGS. 4B and 4C are repaired simultaneously.

A specific driving condition will now be described. It is assumed that the frequency of the AC current to be supplied to both electrodes 15 and 16 is, for example, in a range of about 60 to 500 Hz. In addition, the variable range of the duty ratio indicating the ratio of the operation time of the first electrode 15 as an anode during one cycle is, for example, in a range of 30%:70% to 70%:30%. Each of the division periods constituting the current cycle of the duty ratio is set so as to be, for example, one second or more, and the duty ratio in each of the division periods is maintained constant. Here, the modulation cycle is divided into, for example, about eight periods, and thus the modulation cycle of the duty ratio including all the division periods each being set so as to be one second becomes, for example, eight seconds. With such a modulation pattern, the thermal states of both electrodes 15 and 16 and the periphery thereof can be slowly changed over such a long span that the convection AF is influenced. Therefore, normal convection AF can be avoided from being formed inside the body portion 11 of the light-emitting tube 1. As a result, the electrode material can be prevented from being grown in the form of needle at unintended places of both electrodes 15 and 16, and the shapes of both electrodes 15 and 16 can be prevented from being rapidly deteriorated.

Figure 5:
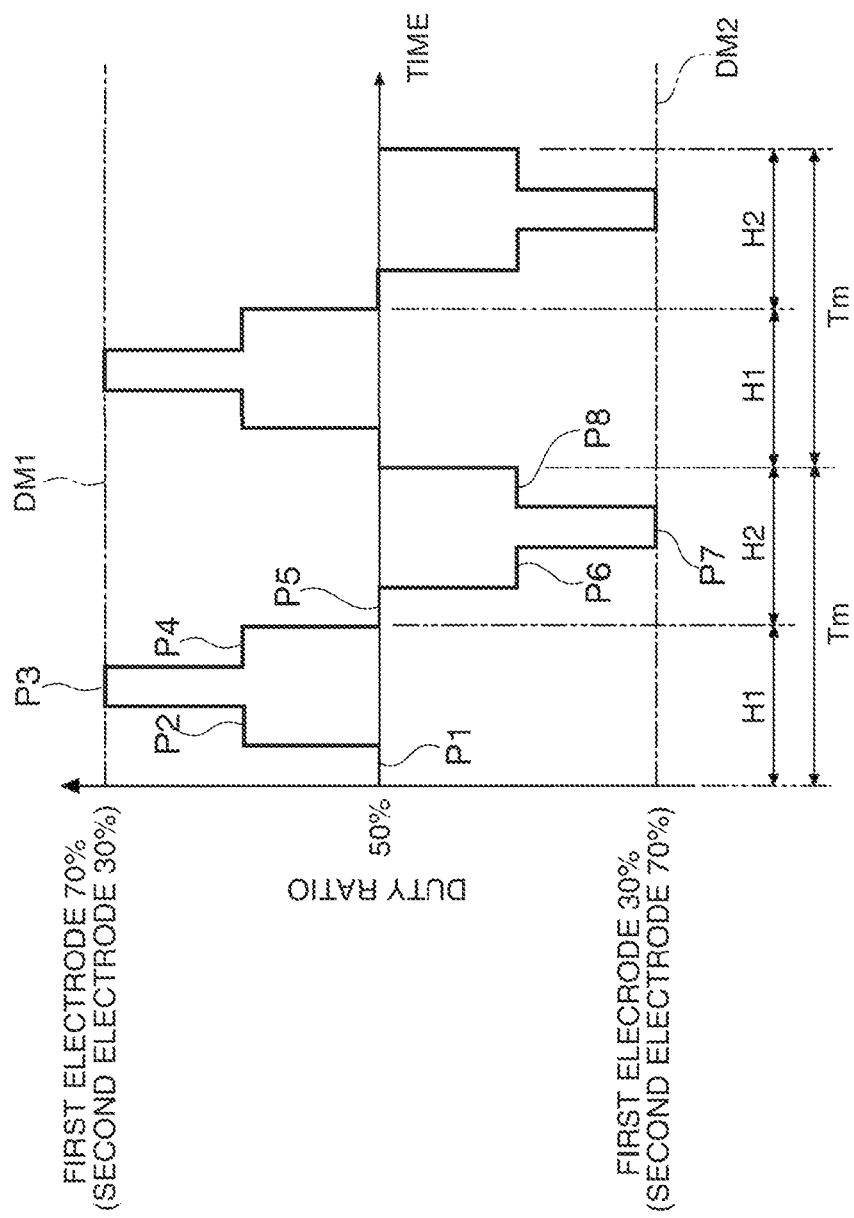
FIG. 5 is a diagram illustrating the waveform of an AC current to be supplied to both electrodes.

FIG. 5 is a graph illustrating an example of the modulation pattern regarding the AC current duty ratio of the current waveform to be supplied to a pair of electrodes 15 and 16. The horizontal axis represents a time, and the vertical axis represents an AC current duty ratio. As will be apparent from FIG. 5, the duty ratio of the AC current to be supplied to both electrodes 15 and 16 changes at a predetermined ratio if the division cycle changes, and cyclically increases or decreases in a modulation cycle Tm. The modulation cycle Tm includes a first half cycle H1 in which an anode period of the first electrode 15 becomes relatively long, and a second half cycle H2 in which an anode period of the second electrode 16 becomes relatively long. As the modulation pattern of the duty ratio of the AC current, a pattern is used in which one cycle is divided into 8 division periods P1 to P8, and the duty ratio during the anode period of the first electrode 15 is changed five times in three steps at an interval of 10% in a range of 30% to 70%. Specifically, during the division period P1 of the first half cycle H1, the duty ratio is maintained at 50% over a predetermined period of time (for example, about one second), during the division period P2, the duty ratio is maintained at 60% over the same predetermined period of time, during the division period P3, the duty ratio is maintained at 70% over the same predetermined period of time, and during the division period P4, the duty ratio is maintained at 60% over the same predetermined period of time. Subsequently, during the division periods P5, P6, P7, and P8 constituting the second half cycle H2, the duty ratio is maintained at 50, 40, 30, and 40% over a predetermined period of time, respectively. In this way, if the duty ratio is increased or decreased in a stepwise manner, heat shock against the tip portions 15a and 16a of both electrodes 15 and 16 can be reduced. The maximum value DM1 of the duty ratio during the anode period of the first electrode 15 in the first half cycle H1 in which the first electrode 15 serves as an anode, and the maximum value DM2 of the duty ratio during the anode period of the second electrode 16 in the second half cycle H2 in which the second electrode 16 serves as an anode are set so as to be identical, for example, 70%.

Hereinafter, the fact that the first electrode 15 on the auxiliary mirror 3 side becomes higher than the second electrode 16 on the reflector 2 side in temperature will be described. First, the first electrode 15 is located closer to the auxiliary mirror 3 than the second electrode 16, and accordingly, the first electrode 15 is liable to be exposed to radiation heat from the auxiliary mirror 3. For this reason, the first electrode 15 is liable to become relatively higher than the second electrode 16 in temperature. The light source unit 10 is cooled to an adequate temperature by cooling wind from a cooling device (not shown), but cooling efficiency tends to be lowered in the hemisphere of the body portion 11 of the light-emitting tube 1 covered with the auxiliary mirror 3. Therefore, the first electrode 15 is liable to relatively become higher than the second electrode 16 in temperature. As described above, the first electrode 15 on the auxiliary mirror 3 side is liable to become higher than the second electrode 16 in temperature, and thus the deterioration rate of the first electrode 15 is increased. For this reason, unevenness occurs in the AC current to be supplied to the first and second electrodes 15 and 16. Specifically, the current value I1, which is the maximum value or the average value when the first electrode 15 operates as an anode during one cycle, is set so as to be smaller than the current value I2, which is the maximum value or average value when the second electrode 16 operates as an anode during one cycle. As a method for generating such a driving waveform, a superimposed current in which a DC component having a negative correction amount d is superimposed on an AC component having the same positive and negative amplitudes, A0, is supplied between both electrodes 15 and 16. When this happens, the current value when the first electrode 15 serves as an anode becomes I1=A0−d (the absolute current value |I1|=A0−d), and the current value when the second electrode 16 serves as an anode becomes I2=−A0−d (the absolute current value |I2|=A0+d). Therefore, power to be supplied to the first electrode 15 relatively decreases, as compared with power to be supplied to the second electrode 16, and thus the rise in temperature of the first electrode 15 on the auxiliary mirror 3 side can be suppressed. Specifically, the correction amount d on the first electrode 15 side is set so as to be, for example, about 20% of the amplitude A0 of the AC component. Therefore, the first electrode 15 on the auxiliary mirror 3 side can be prevented from wearing off unevenly, while the luminance of the arc AR can be ensured. The correction amount d of the current by the DC component is not limited to the value 20%, but it may be appropriately adjusted in accordance with how the first electrode 15 is liable to have a higher temperature.

In the above description, the fact that the first electrode 15 of the auxiliary mirror 3 side has a higher temperature means that during the steady operation, power of the same amplitude or duty ratio is fed to the first electrode 15 and the second electrode 16, and the first electrode 15 becomes higher than the second electrode 16 in temperature. For example, it means a case in which the maximum temperature during one cycle of the AC current to be supplied between both electrodes 15 and 16 relatively becomes high on the first electrode 15 side, a case in which the average temperature during one cycle relatively becomes high on the first electrode 15 side, or a case in which the average temperature during an anode period relatively becomes high on the first electrode 15 side.

Figure 6:
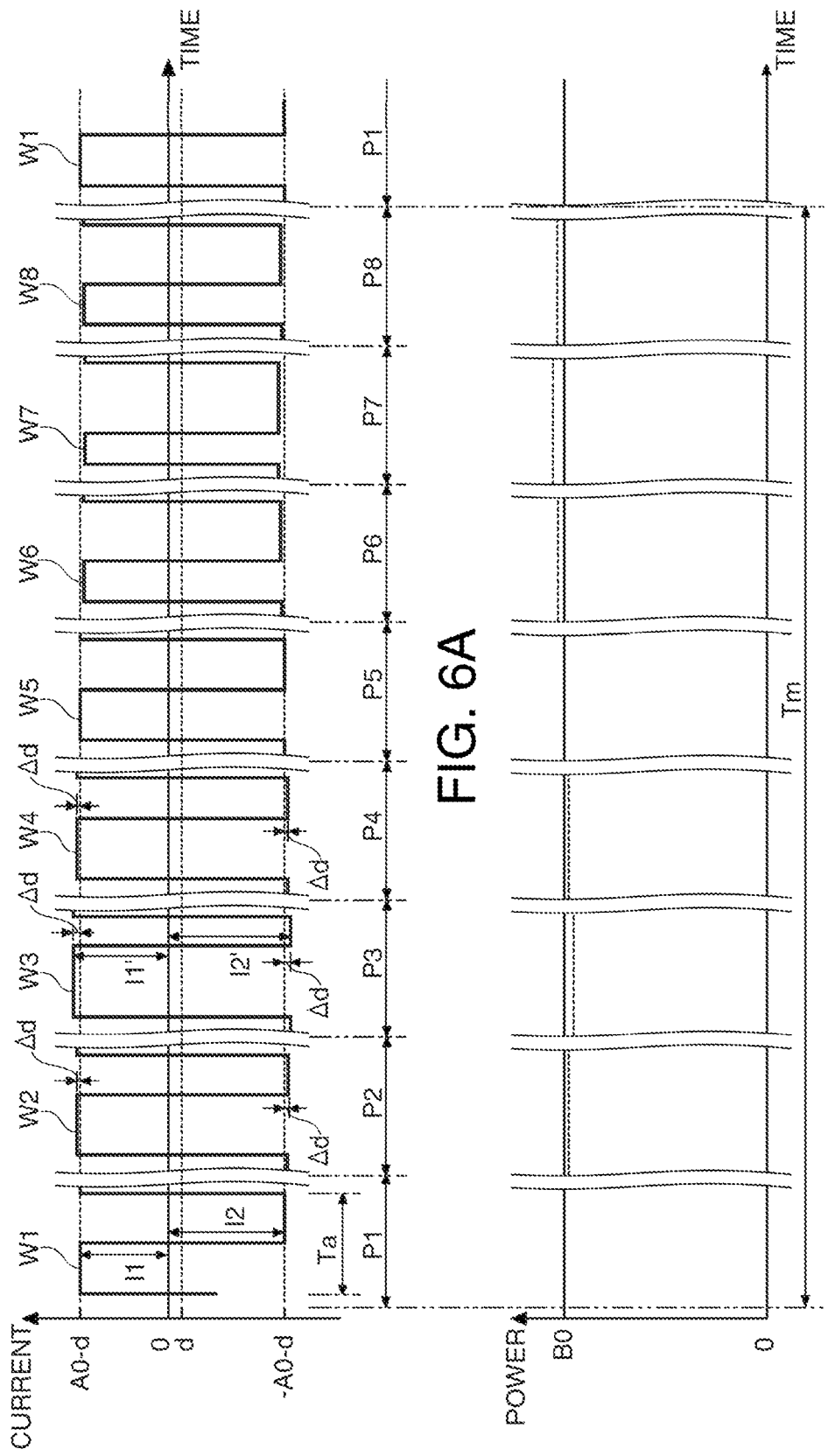
FIGS. 6A and 6B are diagrams illustrating an AC current to be supplied to both electrodes.

FIG. 6A is a graph illustrating a driving waveform which is actually supplied to a pair of electrodes 15 and 16. The horizontal axis represents a time, and the vertical axis represents a current value. As shown in FIG. 6A, a square wave current having a predetermined lighting frequency corresponding to the AC cycle Ta is supplied to both electrodes 15 and 16. In this case, though described below in detail, the square wave current is not maintained to a predetermined amplitude, that is, the absolute current values I1 and I2, but the square wave current slightly increases or decreases by an adjustment amount Δd of power from the standard value and has the absolute current values I1' and I2' that vary in a stepwise manner.

In FIG. 6A, with respect to the waveforms W1, W2, W3, and W4 individually included in the division periods P1, P2, P3, and P4 constituting the first half cycle H1 (see FIG. 5), the duty ratio of the AC current during each division period is maintained constant. Then, each time the division periods P1, P2, P3, and P4 are switched, the duty ratio indicating the ratio of the operation time of the first electrode 15 as an anode during one cycle of a corresponding one of the waveforms W1, W2, W3, and W4 increases to 50% to 70% in a stepwise manner, reversely decreases to 70% to 30% in a stepwise manner, and finally increases to 30% to 50% in a stepwise manner, thereby returning to the even state. Meanwhile, with respect to the waveforms W5, W6, W7, and W8 individually included in the division periods P5, P6, P7, and P8 constituting the second half cycle H2 (see FIG. 5), the duty ratio of the AC current during each division period is maintained constant. Then, each time the division periods P5, P6, P7, and P8 are switched, the duty ratio of a corresponding one of the waveforms W5, W6, W7, and W8 temporarily decreases in a stepwise manner, reversely increases in a stepwise manner, and finally increases in a stepwise manner, thereby returning to the even state.

FIG. 6B is a graph illustrating power which is actually to be supplied to a pair of electrodes 15 and 16. In this case, consequently, power is maintained at a predetermined value B0, as indicated by a solid line. A dotted line represents a case in which the amplitude is not adjusted, that is, the amplitude is not increased or decreased, unlike the driving waveform of FIG. 6A, and represents power when the absolute current value I1 or I2 is maintained at a predetermined value. When the amplitude is not adjusted, power increases or decreases in the modulation cycle Tm in accordance with switching of the division periods P1 to P8. The change in power counteracts the rated operation, and means, though not noticeable, a change in luminance. For this reason, in order to suppress the change in power, with respect to the waveforms W2, W3, W4, W6, W7, and W8 of FIG. 6A, the values obtained by slightly decreasing or increasing the standard current values I1=A0−d and I2=−A0−d by the adjustment amount Δd are set as the current values I1' and I2'. In the above description, the adjustment amount Δd of each of the waveforms W2, W3, W4, W6, W7, and W8 becomes identical when the first electrode 15 serves as an anode during one cycle and when the second electrode 16 serves as an anode during one cycle. That is, the same difference of current value is constantly provided between the absolute current values I1 and I1' when the first electrode 15 operates as an anode, and the absolute current values I2 and I2' when the second electrode 16 operates as an anode, regardless of the change in the duty ratio or the DC component.

Figure 7:
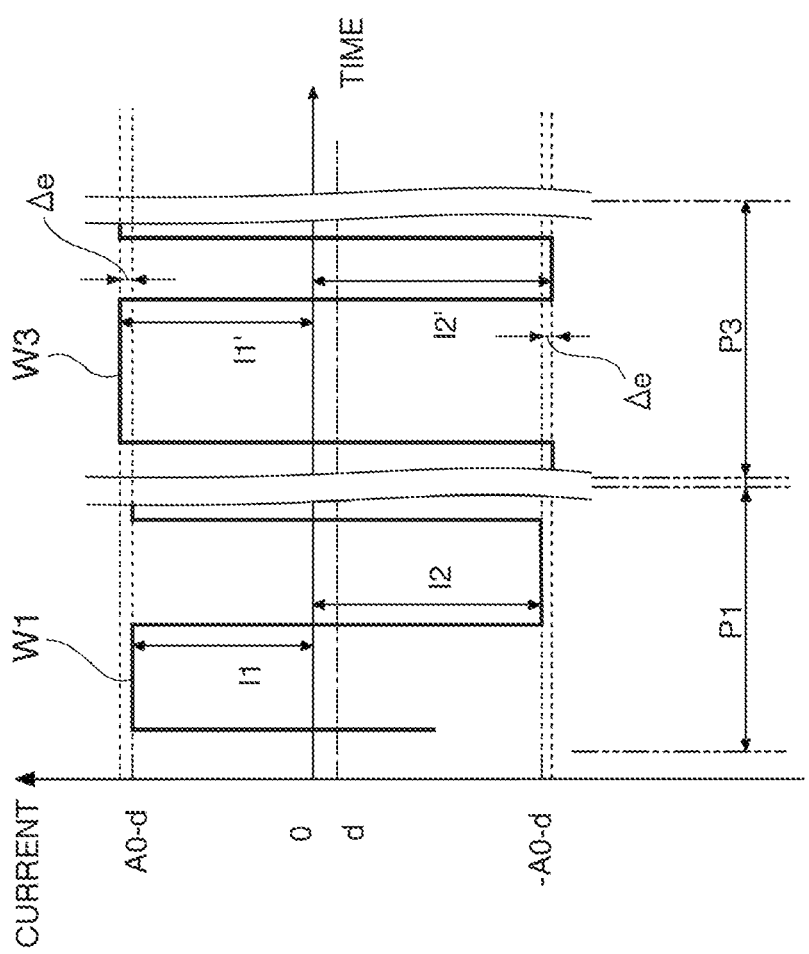
FIG. 7 is a diagram illustrating a modification of an AC current to be supplied to both electrodes.

FIG. 7 is a graph illustrating a modification of the driving waveform of FIG. 6A. In this case, while the waveform W1 of the division period P1 has the standard absolute current values I1 and I2, for example, the waveform W3 of the division period P3 has the absolute current values I1' and I2' that are slightly increased from the standard absolute current values I1 and I2 by an adjustment amount Δe, respectively. The ratio of the adjustment amount Δe when the first electrode 15 serves as an anode during one cycle and the adjustment amount Δe when the second electrode 16 serves as an anode is identical to the ratio of the standard absolute current values I1 and I2. That is, the ratio of both absolute current values I1' and I2' after adjustment is maintained to the ratio of the original absolute current values I1 and I2, and the absolute current values when both electrodes 15 and 16 operate as an anode constantly have a difference of a predetermined ratio, regardless of the change in the duty ratio or the DC component.

Figure 8:
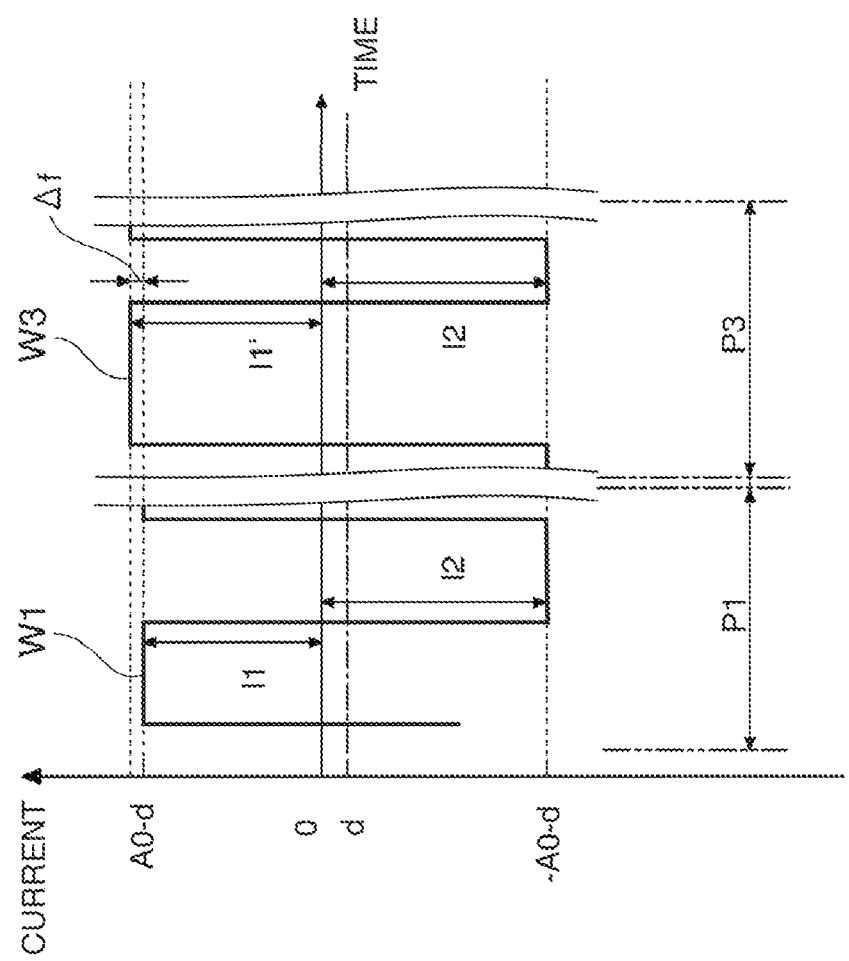
FIG. 8 is a diagram illustrating a modification of an AC current to be supplied to both electrodes.

FIG. 8 is a graph illustrating another modification of the driving waveform of FIG. 6A. In this case, while the waveform W1 of the division period P1 has the standard absolute current values I1 and I2, for example, the waveform W3 of the division period P3 has the absolute current value I1', which is slightly increased from the standard absolute current value I1 by an adjustment amount Δf, at a polarity at which a lighting cycle is relatively long, that is, when the first electrode 15 side serves as an anode. Here, the adjustment amount Δf is set to a value sufficient to suppress the change in power to be supplied to both electrodes 15 and 16. With the adjustment of the current value at a polarity at which a lighting cycle is relatively long, flicker due to a change in the light amount can be reduced by a comparatively small adjustment amount Δf.

Referring to the waveforms shown in FIGS. 6B, 7, and the like, the AC current is supplied to both electrodes 15 and 16, and the duty ratio of the AC current slowly changes to be positive and negative in a comparatively long cycle. In addition, the DC component is superimposed on the AC component while the change in power is suppressed, and thus power to be supplied to the first electrode 15 is set so as to be relatively larger than power to be supplied to the second electrode 16. Therefore, the first and second electrodes 15 and 16 can be prevented from wearing off unevenly while the repair process is performed, and the relative rise in temperature of the first electrode 15 on the auxiliary mirror 3 side can be suppressed.

In the operation pattern of the current waveform shown in FIGS. 6A and 6B, and the like, the lighting frequency and the like of the current to be supplied to both electrodes 15 and 16 does not need to be maintained constant, and different lighting frequencies can be assigned to the division periods P1, P2, P3, . . . . The number of division periods and the increase or decrease pattern of the duty ratio can also be changed. In addition, when the first electrode 15 serves as an anode or when the second electrode 16 serves as an anode, a superimposed wave in which a triangular wave is superimposed on a square wave can be used while the average current value is maintained. Let the average current value of the square wave AC component before being superimposed be A0, and the peak value after being superimposed be A1, with the adjustment of a thus-defined triangular wave jump rate A1/A0, the tip of the anode can be sufficiently melted, and flicker in the cathode can be suppressed.

In the operation pattern of the current waveform shown in FIGS. 6A and 6B, and the like, the set values of the lighting frequency, the duty ratio, the modulation contents of the duty ratio, a difference between positive and negative amplitudes, the ratio of positive and negative amplitudes, the triangular wave jump rate, and the like can be dynamically changed as occasion demands on the basis of information regarding a deterioration level obtained by the determination section 75, for example, how both electrodes 15 and 16 wear off. For example, when both electrodes 15 and 16 wear off, the lighting frequency and the current value temporarily increase or decrease, thereby maintaining the shapes of the tip portions 15a and 16a of both electrodes 15 and 16. In addition, by increasing the maximum values DM1 and DM2 of the duty ratio, the electrodes which are deteriorated as time passes can be reliably melted, and the shapes of the tips can be preferably maintained.

Figure 9:
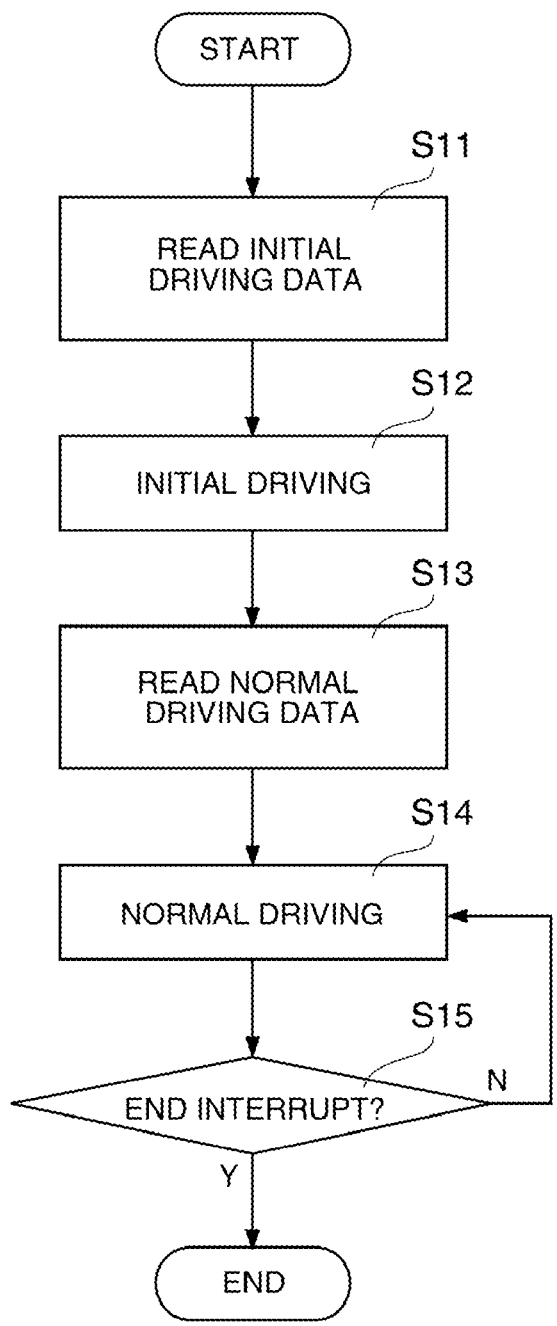
FIG. 9 is a flowchart illustrating the operation of a light source driving device.

FIG. 9 is a flowchart illustrating the operation of the light source driving device 70. The control device 70b reads out adequate initial driving data necessary for starting to turn on the light-emitting tube 1 from a driving control table stored in the data storage section 76 (Step S11).

Next, the control device 70b controls the lighting device 70a on the basis of a power feed condition for an initial operation read in Step S11, and controls the initial operation including initiation and rising of the light-emitting tube 1 (Step S12).

Next, the control device 70b reads out adequate normal driving data necessary for maintaining the emission state of the light-emitting tube 1 from the driving control table stored in the data storage section 76 (Step S13). Specifically, the set values of the lighting frequency, the duty ratio, the modulation contents of the duty ratio, the difference between positive and negative amplitudes, the ratio of positive and negative amplitudes, the triangular wave jump rate, and the like during the steady operation are read out. In this case, a lighting waveform, such as the lighting frequency, the current value regarding positive and negative amplitudes, and the like, and a driving pattern including the modulation range of the duty ratio, the division period, the modulation cycle, and the like is selected on the basis of information regarding a deterioration level obtained by the determination section 75, for example, how both electrodes 15 and 16 wear off.

Next, the control device 70b controls the steady operation of the light-emitting tube 1 of the lighting device 70a on the basis of a power feed condition for a steady operation read in Step S13 (Step S14). A specific operation is illustrated in FIGS. 4A to 4C, 5, 6A and 6B, 7, and 8.

The determination section 75 determines whether or not an interrupt request signal for requesting the end of the lighting operation of the light source unit 10 is input during the steady operation (Step S15). When the interrupt request signal is input, information regarding the current state of the light-emitting tube 1, such as a current cumulative lighting time, a voltage being currently supplied to the light-emitting tube 1, and the like, is recorded in the data storage section 76, and then a lighting-out operation is executed.

As will be apparent from the foregoing description, according to the light source device 100 of this embodiment, during the steady operation in which the light-emitting tube 1 is in rated operation, the duty ratio of the AC current to be supplied between the first and second electrodes 15 and 16 is changed in accordance with a cycle pattern by the lighting device 70a, which is operated under the control of the control device 70b, and the current value I1 when the first electrode 15 operates as an anode during one cycle is set so as to be smaller than the current value I2 when the second electrode 16 operates as an anode during one cycle. Therefore, the first electrode 15 can be prevented from being liable to be higher than the second electrode 16 in temperature when power of the same amount is fed, and as a result, the first electrode 15 can be prevented from being deteriorated earlier than the second electrode 16. When the current value when the first electrode 15 serves as an anode is set so as to be smaller than the current value when the second electrode 16 serves as an anode while the duty ratio is not changed in accordance with the cycle pattern, a change in luminance at the lighting frequency occurs and is recognized as flicker of the light source itself, or as the lighting frequency approaches the driving frequency of the display device, the change in luminance is recognized as luminance irregularity (scroll noise) due to interference.

Figure 10:
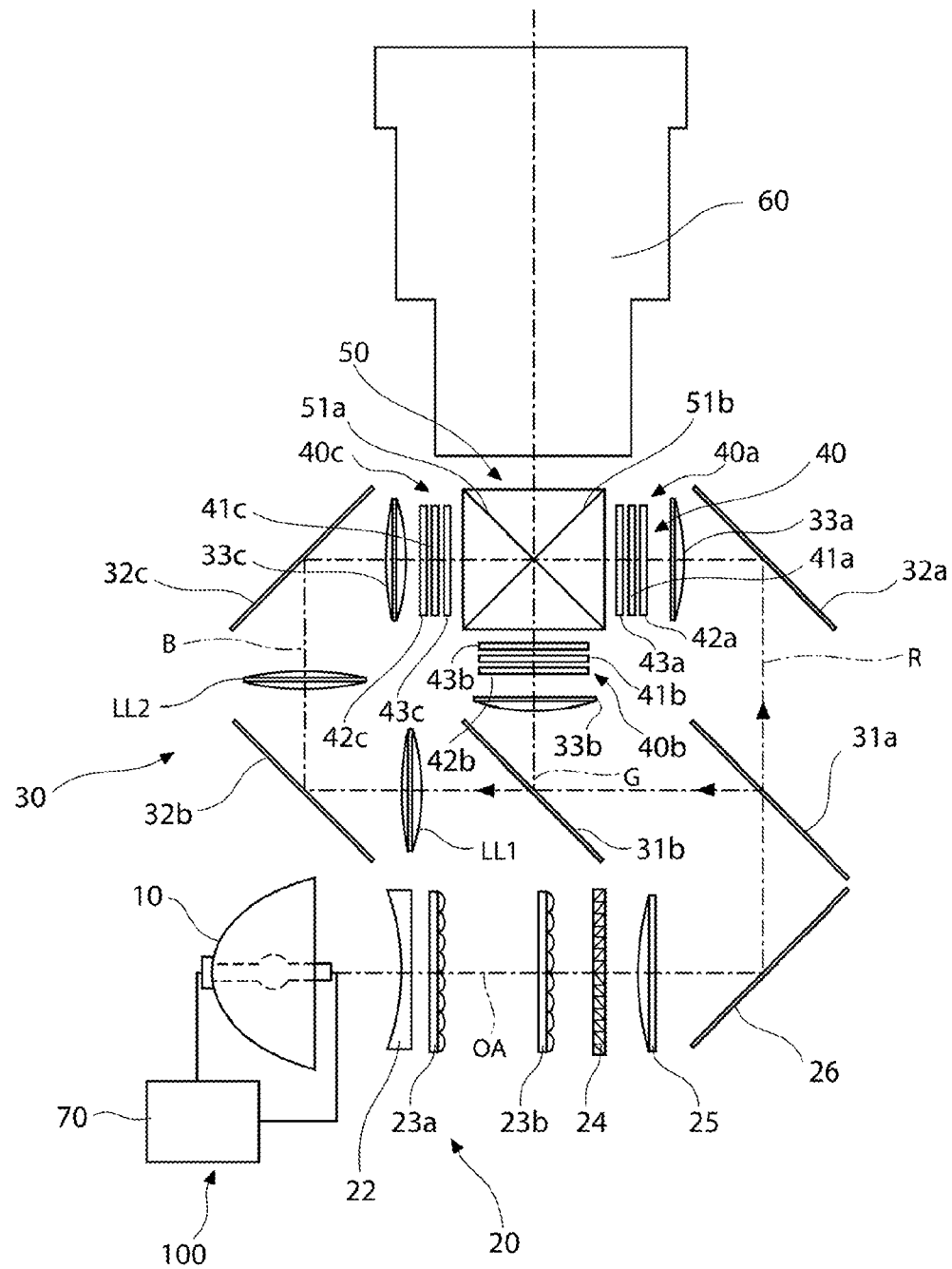
FIG. 10 is a diagram illustrating a projector incorporated with a light source device.

FIG. 10 is a conceptual view illustrating the structure of a projector incorporated with the light source device 100 of FIG. 1. A projector 200 includes a light source device 100, an illumination optical system 20, a color separation optical system 30, a light modulation section 40, a cross dichroic prism 50, and a projection lens 60. The light modulation section 40 includes three liquid crystal light valves 40a, 40b, and 40c having the same structure.

In the projector 200, the light source device 100 includes the light source unit 10 and the light source driving device 70 shown in FIG. 1. The light source device 100 generates illumination light for illuminating the light modulation section 40, that is, the liquid crystal light valves 40a, 40b, and 40c, through the illumination optical system 20.

The illumination optical system 20 includes a parallelizing lens 22 that parallelizes the direction of a light beam emitted from the light source, first and second fly-eye lenses 23a and 23b that constitute an integrator optical system for dividing light into partial light beams and superimposing the partial light beams, a polarization conversion element 24 that arranges the light polarization direction, a superimposing lens 25 that superimposes light having passed through both fly-eye lenses 23a and 23b, and a mirror 26 that bends the optical path of light. In the illumination optical system 20, the parallelizing lens 22 converts the light beam direction of illumination light emitted from the light source unit 10 into substantially parallel light. The first and second fly-eye lenses 23a and 23b each include a plurality of element lenses arranged in a matrix. The element lenses constituting the first fly-eye lens 23a divide light having passed through the parallelizing lens 22 into partial light beams, and collect the partial light beams separately. The element lenses constituting the second fly-eye lens 23b convert the partial light beams from the first fly-eye lens 23a into light beams having an appropriate divergence angle. The polarization conversion element 24 has an array of PBS, mirror, retardation film, and the like as a set of elements, and has a function of converting the partial light beams divided by the first fly-eye lens 23a into one-directional linear polarized light. The superimposing lens 25 appropriately converges illumination light having passed through the polarization conversion element 24 as a whole such that illumination light can be superimposed on regions to be illuminated of the liquid crystal light valves 40a, 40b, and 40c of a subsequent stage as light modulation devices for respective colors. That is, illumination light having passed through both fly-eye lenses 23a and 23b and the superimposing lens 25 passes through the color separation optical system 30, which will be described below in detail, and is superimposed and uniformly illuminates liquid crystal panels 41a, 41b, and 41c for respective colors provided in the light modulation section 40.

The color separation optical system 30 includes first and second dichroic mirrors 31a and 31b, reflecting mirrors 32a, 32b, 32c, and three field lenses 33a, 33b, and 33c. The color separation optical system 30 separates illumination light from the illumination optical system 20 into three color light components of red (R), green (G), and blue (B), and introduces the color light components to the liquid crystal light valves 40a, 40b, and 40c of a subsequent stage, respectively. More specifically, first, the first dichroic mirror 31a transmits the R light component of the three R, G, and B light components, and reflects the G and B light components. The second dichroic mirror 31b reflects the G light component of the two G and B light components, and transmits the B light component. Next, in the color separation optical system 30, the R light component having passed through the first dichroic mirror 31a passes through the reflecting mirror 32a and enters the field lens 33a for controlling the incident angle. The G light component reflected by the first dichroic mirror 31a and further reflected by the second dichroic mirror 31b enters the field lens 33b for controlling the incident angle. The B light component having passed through the second dichroic mirror 31b passes through relay lenses LL1 and LL2 and the reflecting mirrors 32b and 32c, and enters the field lens 33c for controlling the incident angle.

The liquid crystal light valves 40a, 40b, and 40c constituting the light modulation section 40 are non-emission-type light modulation devices for modulating the spatial intensity distribution of incident illumination light. The liquid crystal light valves 40a, 40b, and 40c include three liquid crystal panels 41a, 41b, and 41c that correspondingly receive the color light components emitted from the color separation optical system 30, three first polarizing filters 42a, 42b, and 42c that are disposed on the incident sides of the liquid crystal panels 41a, 41b, and 41c, respectively, and three second polarizing filters 43a, 43b, and 43c that are disposed on the emission sides of the liquid crystal panels 41a, 41b, and 41c, respectively. The R light component having passed through the first dichroic mirror 31a enters the liquid crystal light valve 40a through the field lens 33a to illuminate the liquid crystal panel 41a of the liquid crystal light valve 40a. The G light component reflected by the first and second dichroic mirrors 31a and 31b enters the liquid crystal light valve 40b through the field lens 33b to illuminate the liquid crystal panel 41b of the liquid crystal light valve 40b. The B light component having been reflected by the first dichroic mirror 31a and passed through the second dichroic mirror 31b enters the liquid crystal light valve 40c through the field lens 33c to illuminate the liquid crystal panel 41c of the liquid crystal light valve 40c. The liquid crystal panels 41a to 41c modulate the spatial intensity distribution of incident illumination light in the polarization direction to control the polarization states of the three color light components having entered the liquid crystal panels 41a to 41c for each pixel in accordance with driving signals or image signals input as electrical signals to the liquid crystal panels 41a to 41c. In this case, the first polarizing filters 42a to 42c control the polarization direction of illumination light entering the liquid crystal panels 41a to 41c, respectively. The second polarizing filters 43a to 43c extract modulated light having a predetermined polarization direction from modulated light emitted from the liquid crystal panels 41a to 41c. In this way, the liquid crystal light valves 40a, 40b, and 40c form image light for the respective colors.

The cross dichroic prism 50 synthesizes image light for the respective colors from the liquid crystal light valves 40a, 40b, and 40c. More specifically, the cross dichroic prism 50 has a substantially square shape in plan view formed by affixing four rectangular prisms, and a pair of dielectric multilayer films 51a and 51b crossing in an X shape are formed on the boundaries of the affixed rectangular prisms. The first dielectric multilayer film 51a reflects the R light component, and the second dielectric multilayer film 51b reflects the B light component. The cross dichroic prism 50 reflects the R light component from the liquid crystal light valve 40a by the dielectric multilayer film 51a so as to be emitted to the right with respect to the travel direction. The cross dichroic prism 50 directs the G light component from the liquid crystal light valve 40b so as to advance straight and to be emitted through the dielectric multilayer films 51a and 51b. The cross dichroic prism 50 reflects the B light component from the liquid crystal light valve 40c by the dielectric multilayer film 51b so as to be emitted to the left with respect to the travel direction. In this way, the cross dichroic prism 50 synthesizes the R, G, and B light components to produce synthesized light as image light for forming a color image.

The projection lens 60 is a projection optical system which enlarges image light on a desired scale of enlargement as synthesized light from the cross dichroic prism 50, and projects a color image onto a screen (not shown).

According to the projector 200, a pair of electrodes 15 and 16 constituting the light source device 100 can be alternately repaired, and one of the pair of electrodes 15 and 16 can be prevented from being deteriorated unevenly and early. Therefore, the projection luminance of the projector 200 can be maintained over a long period of time.

The invention is not limited to the foregoing embodiment, but various modifications may be made without departing from the scope of the invention. For example, the following modifications may be made.

For example, the modulation patterns shown in FIGS. 5A to 5C, 6A to 6C, and 7A to 7C are just examples, and an AC current to be supplied to a pair of electrodes 15 and 16 may be changed in accordance with various modulation patterns. In this case, the convection AF can be prevented from being excessively localized inside the light-emitting tube 1 while the first and second electrodes 15 and 16 can be repaired. In addition, one of the pair of electrodes 15 and 16 can be prevented from being deteriorated unevenly and early.

In the foregoing embodiment, a case in which the auxiliary mirror 3 is provided, and accordingly the first electrode 15 becomes higher than the second electrode 16 in temperature has been described. Even if no auxiliary mirror 3 is provided, in an air-cooled state, a difference in temperature may occur between both electrodes 15 and 16, or if both electrodes 15 and 16 are different in size, a difference in temperature may occur between both electrodes 15 and 16. In this case, by using the waveforms shown in FIGS. 5A to 5C, 6A to 6C, and 7A to 7C, current driving can be achieved with the difference in temperature between both electrodes 15 and 16 compensated.

As the lamp for the light source unit 10 of the foregoing embodiment, various kinds of lamps, such as a high-pressure mercury lamp, a metal halide lamp, or the like, may be used.

In the projector 200 of the foregoing embodiment, in order to separate light from the light source device 100 into a plurality of partial light beams, a pair of fly-eye lenses 23a and 23b are used, but the invention may be applied to a projector in which no fly-eye lens, that is, no lens array is used. In addition, the fly-eye lenses 23a and 23b may be substituted with a rod integrator.

The projector 200 uses the polarization conversion element 24 that converts light from the light source device 100 into polarized light in a specific direction, but the invention may be applied to a projector in which no polarization conversion element 24 is used.

In the foregoing embodiment, an example where the invention is applied to a transmission type projector has been described, but the invention may be applied to a reflection type projector. The term "transmission type" herein means a liquid crystal light valve including a liquid crystal panel and the like transmits light, and the term "reflection type" means that a liquid crystal light valve reflects light. The light modulation device is not limited to a liquid crystal panel. For example, a light modulation device using a micro mirror may be used.

There are a front type projector that projects an image from the projection surface viewing side, and a rear type projector that projects an image from the side opposite to the projection surface viewing side. The configuration of the projector shown in FIG. 10 may be applied to both types.

In the foregoing embodiment, only an example of the projector 200 which uses the three liquid crystal panels 41a to 41c has been described, but the invention may be applied to a projector which uses a single liquid crystal panel, a projector which uses two liquid crystal panels, or a projector which uses four or more liquid crystal panels.

In the foregoing embodiment, the color light components are modulated by using the color separation optical system 30 and the liquid crystal light valves 40a, 40b, and 40c. Alternatively, the color light components may be modulated and synthesized by using a combination of a color wheel which is illuminated by the light source device 100 and the illumination optical system 20, and a device which includes pixels of micro mirrors and onto which light having passed through the color wheel is irradiated.

The entire disclosure of Japanese Patent Application No. 2008-49293, filed Feb. 29, 2008 is expressly incorporated by reference herein.

What is claimed is:

1. A method for driving a discharge lamp that supplies an AC current to a discharge lamp having a first electrode and a second electrode so as to produce discharge and to cause the discharge lamp to emit light, comprising the steps of:

in a situation where a tip portion of the first electrode becomes higher than a tip portion of the second electrode in temperature when power of the same amount is fed to the first and second electrodes during a steady operation in which the AC current is supplied to the first electrode and the second electrode, changing the duty ratio of the AC current to be supplied between the first electrode and the second electrode in accordance with a predetermined pattern while the duty ratio of the AC current is maintained constant for one second, and setting a current value when the first electrode operates as an anode during one cycle so as to be smaller than a current value when the second electrode operates as an anode during one cycle.

2. The method according to claim 1,
wherein a primary reflecting mirror is disposed on the second electrode side to reflect a light beam generated by discharge between the first electrode and the second electrode so as to be emitted toward a region to be illuminated, and an auxiliary reflecting mirror is disposed on the first electrode side so as to be opposite the primary reflecting mirror to reflect a light beam from an inter-electrode space between the first electrode and the second electrode toward the inter-electrode space.

3. A projector comprising:
a light source device that is driven by the driving method according to claim 2 and emits light;
a light modulation device that receives a light beam from the light source device; and
a projection optical system that projects an image formed by the light modulation device.

4. The method according to claim 1,
wherein the AC current constantly provides a difference of a predetermined current value between the absolute value of the current value when the first electrode operates as an anode during one cycle and the absolute value of the current value when the second electrode operates as an anode during one cycle.

5. A projector comprising:
a light source device that is driven by the driving method according to claim 4 and emits light;
a light modulation device that receives a light beam from the light source device; and
a projection optical system that projects an image formed by the light modulation device.

6. The method according to claim 1,
wherein the AC current constantly provides a difference of a predetermined ratio between the absolute value of the current value when the first electrode operates as an anode during one cycle and the absolute value of the current value when the second electrode operates as an anode during one cycle.

7. A projector comprising:
a light source device that is driven by the driving method according to claim 6 and emits light;
a light modulation device that receives a light beam from the light source device; and
a projection optical system that projects an image formed by the light modulation device.

8. The method according to claim 1,
wherein the current value is controlled such that the average power value during one cycle of the AC current substantially becomes identical to the average power value during one cycle of the predetermined pattern.

9. The method according to claim 8,
wherein the current value is controlled only at a polarity having a larger duty ratio during one cycle of the AC current.

10. A projector comprising:
a light source device that is driven by the driving method according to claim 9 and emits light;
a light modulation device that receives a light beam from the light source device; and
a projection optical system that projects an image formed by the light modulation device.

11. A projector comprising:
a light source device that is driven by the driving method according to claim 8 and emits light;
a light modulation device that receives a light beam from the light source device; and
a projection optical system that projects an image formed by the light modulation device.

12. A projector comprising:
a light source device that is driven by the driving method according to claim 1 and emits light;
a light modulation device that receives a light beam from the light source device; and
a projection optical system that projects an image formed by the light modulation device.

13. A driving device that supplies an AC current to a discharge lamp having a first electrode and a second electrode so as to produce discharge and to cause the discharge lamp to emit light, the driving device comprising:
a current driving circuit that, in a situation where a tip portion of the first electrode becomes higher than a tip portion of the second electrode in temperature when power of the same amount is fed to the first and second electrodes during a steady operation in which the AC current is supplied to the first electrode and the second electrode, changes the duty ratio of the AC current to be supplied between the first electrode and the second electrode in accordance with a predetermined pattern while the duty ratio of the AC current is maintained constant for one second, and sets the absolute value of a current value when the first electrode operates as an anode during one cycle so as to be smaller than the absolute value of a current value when the second electrode operates as an anode during one cycle.

14. A projector comprising:
a light source device that includes a discharge lamp having a first electrode and a second electrode and emits light;
a driving device according to claim 13;
a light modulation device that receives a light beam from the light source device; and
a projection optical system that projects an image formed by the light modulation device.

* * * * *